R. W. GIESE.
GARMENT HANGER.
APPLICATION FILED SEPT. 14, 1910.
977,727.
Patented Dec. 6, 1910.
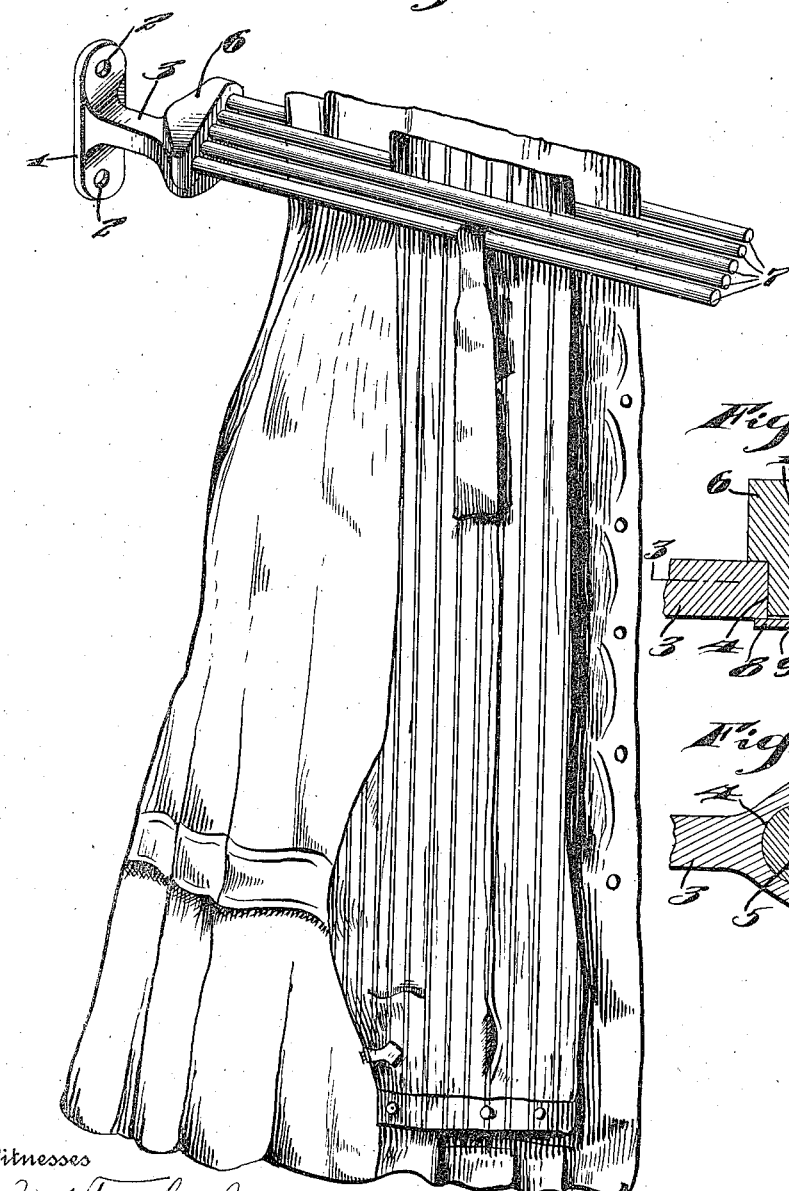
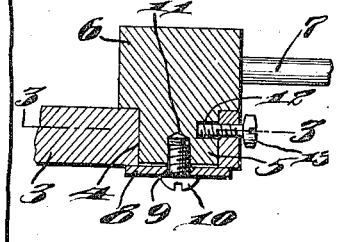

UNITED STATES PATENT OFFICE.

ROBERT W. GIESE, OF PHILADELPHIA, PENNSYLVANIA.

GARMENT-HANGER.

977,727.

Specification of Letters Patent.

Patented Dec. 6, 1910.

Application filed September 14, 1910. Serial No. 582,005.

*To all whom it may concern:*

Be it known that I, ROBERT W. GIESE, a citizen of the United States, residing at Philadelphia, in the county of Philadelphia and State of Pennsylvania, have invented certain new and useful Improvements in Garment-Hangers, of which the following is a specification.

My invention relates to improvements in garment hangers, the object of the invention being to provide a simple inexpensive construction of hanger which is adapted for supporting trousers, skirts, and other articles, which will occupy but small space in a room, and which is so constructed as to prevent injury to the wall by reason of movement of the device.

With these and other objects in view, the invention consists in certain novel features of construction and combinations and arrangements of parts, as will be more fully hereinafter described and pointed out in the claims.

In the accompanying drawings: Figure 1, is a perspective view illustrating my improvements. Fig. 2, is an enlarged fragmentary view in section illustrating the pivotal connection of the supporter, and Fig. 3, is a view in section on the line 3—3 of Fig. 2.

I represents a bracket having screw receiving openings 2 to secure the same to a wall or other support. This bracket 1 is provided with an outwardly projecting arm 3 having a bearing 4 near its free end. This bearing 4 is adapted to receive a journal 5 integral with a block 6 supported to turn on the arm 2. This block 6 is elongated transversely, and a plurality of parallel spring rods 7 are secured at one end in the block 6, and serve to support trousers, skirts, ties, and various articles such as illustrated in Fig. 1.

The journal 5 is preferably slightly shorter than the depth of bearing 4, and a disk 8 bears against the lower face of arm 3, is of greater diameter than the bearing, and is provided with a central opening 9 for a screw 10, which is screwed into a threaded socket 11 in the end of the journal, and by tightening this screw, the frictional engagement of the block with the arm may be regulated so as to prevent a free swinging movement of the block so as to compel the hanger to remain in any position to which it is moved.

Journal 5 is provided in one face with a curved groove 12 into which a screw 13 screwed through an opening in arm 3 projects. The end walls of this groove 12 serve to strike the screw 13 and limit the turning movement of the journal in the arm, thereby preventing the hanger from being swung around in contact with the wall to the injury of the latter.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A garment hanger of the character described, comprising a bracket, an arm on the bracket having a bearing therein, a block, a plurality of parallel spring rods on the block, a journal on the block located in said bearing, means for frictionally clamping said journal in the bearing, and means for limiting the turning movement of the journal in the bearing, substantially as described.

2. A garment hanger of the character described, comprising a bracket, an arm on the bracket having a bearing therein, a block, a plurality of parallel spring rods on the block, a journal on the block located in said bearing, said bearing of greater depth than the journal and having a screw threaded socket in its lower end, a disk against the lower face of said arm having a central opening, and a screw projected through said opening in the disk and screwed into the socket in the journal, substantially as described.

3. A garment hanger of the character described, comprising a bracket, an arm on the bracket having a bearing therein, a block, a plurality of parallel spring rods on the block, a journal on the block located in said bearing, said bearing of greater depth than the journal and having a screw threaded socket in its lower end, a disk against the lower face of said arm having a central opening, a screw projected through said opening in the disk and screwed into the socket in the journal, said journal having a curved annular groove, a screw in the arm projected into said groove, and the end walls of said groove adapted to engage the screw and limit the turning movement of the journal, substantially as described.

In testimony whereof I have signed my name to this specification in the presence of two subscribing witnesses.

ROBERT W. GIESE.

Witnesses:
R. H. KRENKEL,
C. E. POTTS.